No. 615,172. Patented Nov. 29, 1898.
H. K. HESS.
PRIMARY BATTERY.
(Application filed Feb. 2, 1898.)
(No Model.) 3 Sheets—Sheet 1.
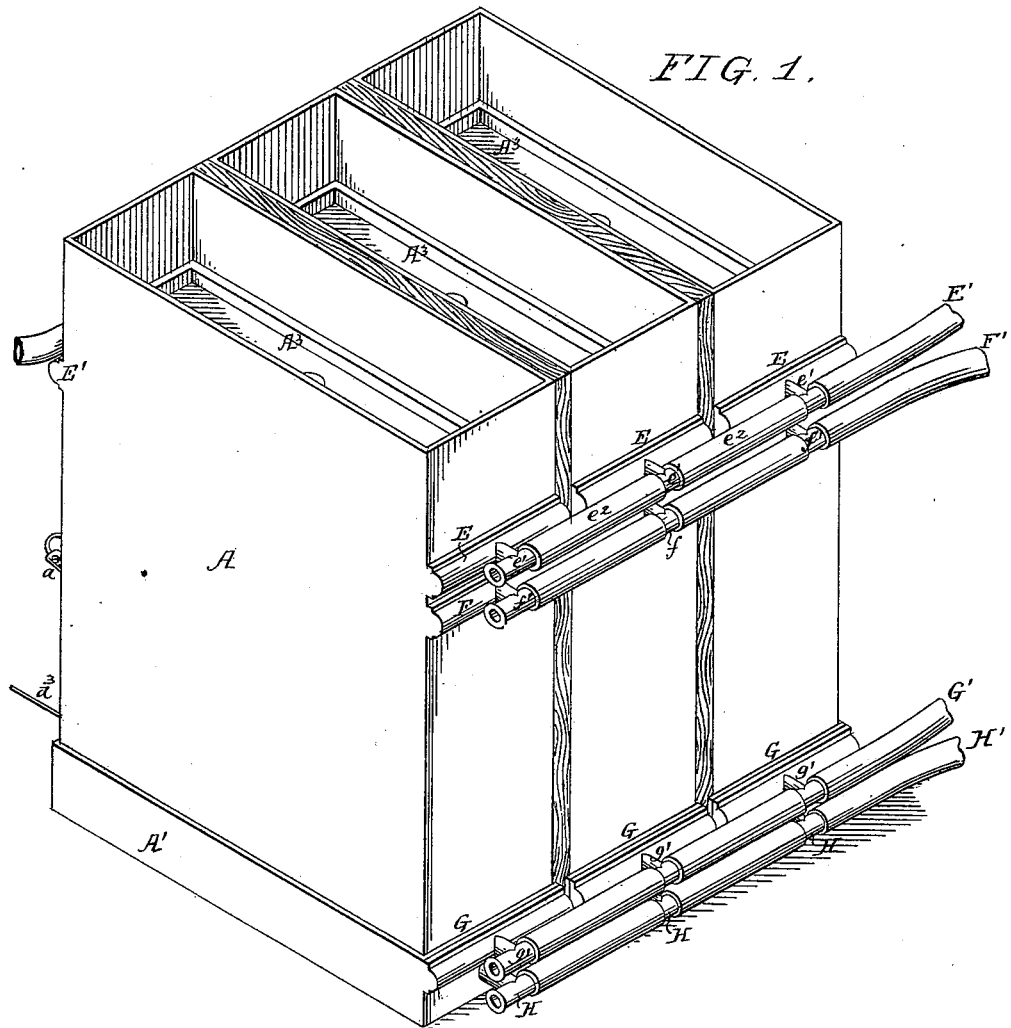
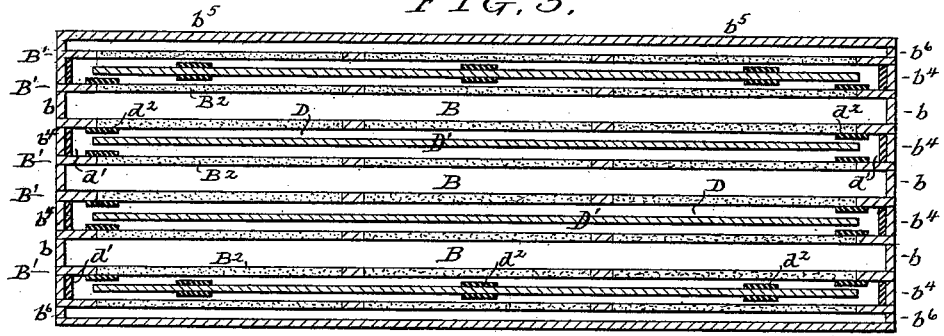
Witnesses:
Frank McGraham
Will. A. Barr.
Inventor:
Henry K. Hess,
by his Attorneys
Howson & Howson

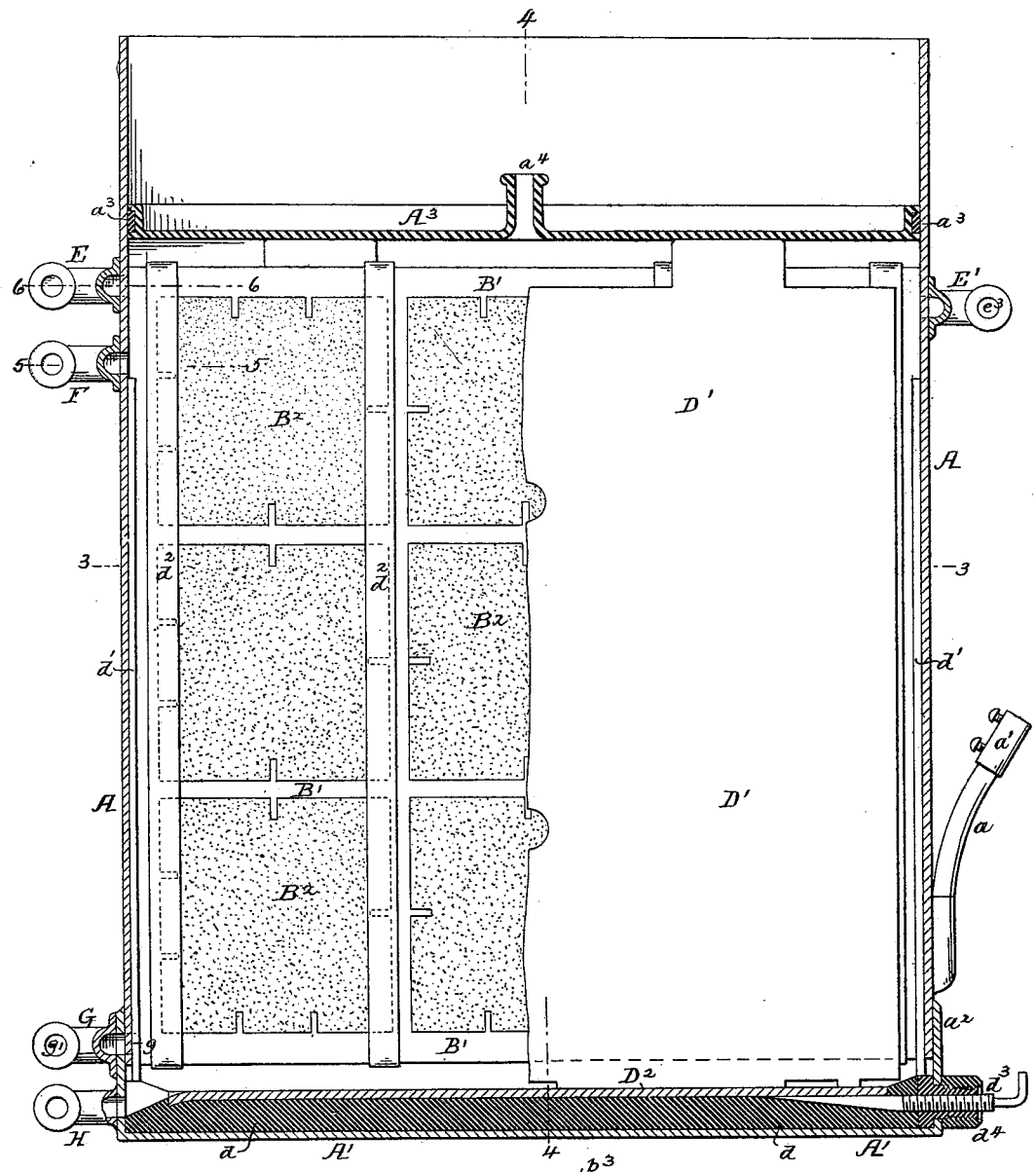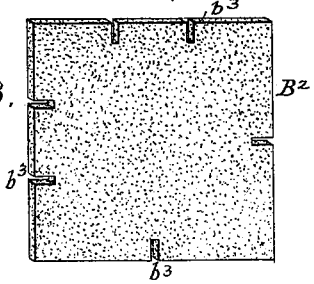

No. 615,172. Patented Nov. 29, 1898.
H. K. HESS.
PRIMARY BATTERY.
(Application filed Feb. 2, 1898.)
(No Model.) 3 Sheets—Sheet 3.
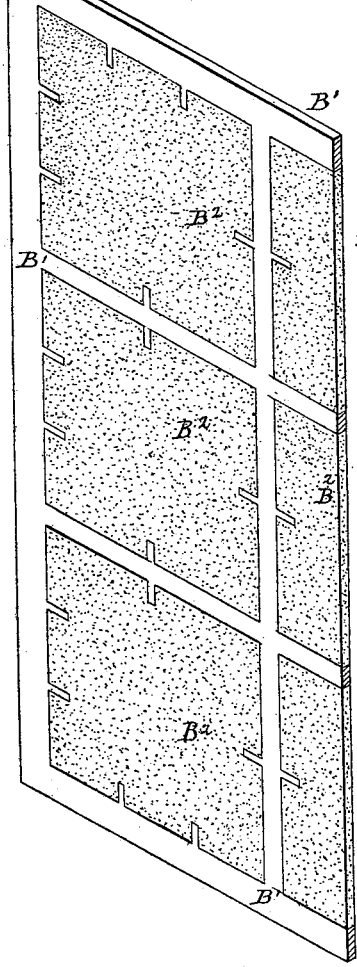
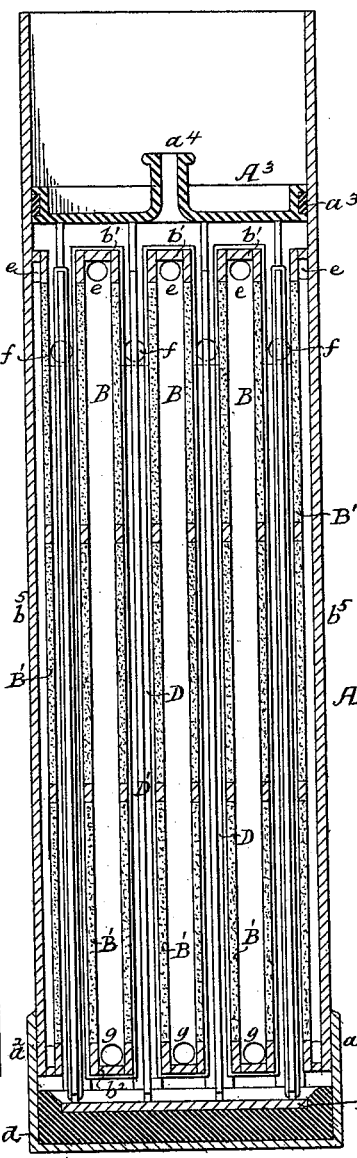
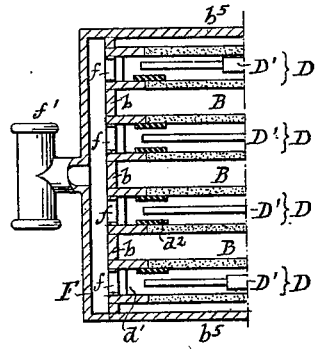
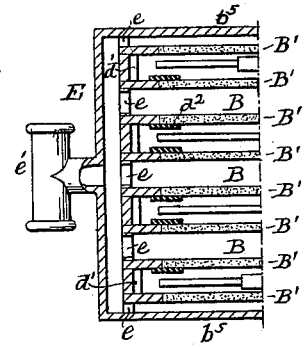
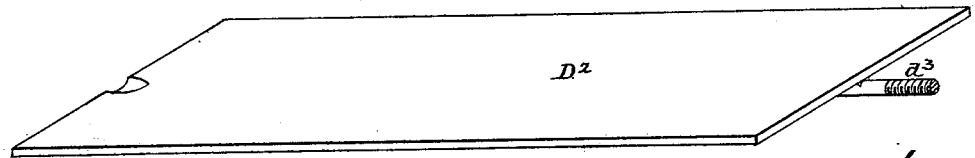
Witnesses:
Frank H. Graham
Will. A. Barr.
Inventor:
Henry K. Hess
by his Attorneys
Howson & Howson

UNITED STATES PATENT OFFICE.

HENRY K. HESS, OF PHILADELPHIA, PENNSYLVANIA.

PRIMARY BATTERY.

SPECIFICATION forming part of Letters Patent No. 615,172, dated November 29, 1898.

Application filed February 2, 1898. Serial No. 668,827. (No model.)

*To all whom it may concern:*

Be it known that I, HENRY K. HESS, a citizen of the United States, residing in Philadelphia, Pennsylvania, have invented certain Improvements in Primary Batteries, of which the following is a specification.

My invention relates to certain improvements in primary batteries of the type in which two liquids are used, one liquid being a depolarizing agent and the other being an excitant in which is immersed zinc either in the form of a plate or in the form of granules.

The object of my invention is to simplify the construction of a battery of the type alluded to above, to reduce the weight and increase the active surface, and to make it more compact than heretofore.

By my invention I am enabled to construct a battery that will withstand rough usage and jars, thus making it adaptable for use in railroad, vehicle, and boat service, and I also construct the battery so that it can be charged with liquid or discharged without removing the cells. The zinc plate is the only solid element that will have to be occasionally removed and replaced.

In the accompanying drawings, Figure 1 is a perspective view of a series of my improved batteries, showing them coupled to the charging and discharging tubes. Fig. 2 is a sectional elevation through the zinc compartment. Fig. 3 is a sectional plan view on the line 3 3, Fig. 2. Fig. 4 is a sectional elevation on the line 4 4, Fig. 2. Fig. 5 is a section on the line 5 5, Fig. 2. Fig. 6 is a section on the line 6 6, Fig. 2. Fig. 7 is a sectional perspective view of one of the carbon partition-plates. Fig. 8 is a perspective view of one of the sections of the carbon partition-plates shown in Fig. 7, and Fig. 9 is a perspective view of the bottom contact-plate for the zincs.

A is a quadrangular inclosing casing, in the present instance made of lead and used as a conductor for the carbon plates, and attached to the casing at one side is a terminal wire $a$, having a coupling $a'$. The bottom A' of the casing is made separate from the body and has a deep flange $a^2$, which extends on the outside of the body, as shown in Figs. 2 and 4, and this flange is attached to the body by burning or by other means. Within the body of the casing I arrange a series of compartments B for the depolarizing agent. These compartments are made up of two carbon partition-plates B', connected together at the side by strips $b$ and at the top by a strip $b'$ and at the bottom by a strip $b^2$, so that each compartment is closed.

The porous partition-plates B' are made of a series of thin porous carbon sections $B^2$, Fig. 8, held together by a lead frame, Fig. 7. The partition-plates are made by mounting the sections $B^2$ in a suitable mold, into which is poured molten lead or other suitable metal which flows around the sections, forming the frame shown in Fig. 7. In some instances the sections $B^2$ may be made of earthenware or a combination of earthenware and carbon; but I prefer to use carbon, as it is an electrical conductor.

In order to prevent the frame pulling away from the carbon sections, I notch the said section at $b^3$, so that the molten metal will flow into the notches, and thus lock the frame to the plates. These notches in some instances may be undercut or otherwise formed to prevent the warping of the frame when the edge strips are secured thereto by burning.

It will be noticed in referring to the drawings that the compartments for the depolarizing agent stop short of the bottom, and they are so spaced as to form compartments D for the exciting liquid and the zinc plates D'. These compartments D communicate with each other at the bottom, as shown in the drawings, and embedded in the non-conducting material $d$ in the bottom section A' is a lead conducting-plate $D^2$. (Shown in perspective in Fig. 9.) The non-conducting material $d$, in which the lead plate is embedded, is preferably asphaltum, which is poured into the bottom section in a molten condition and the lead plate forced into it so as to thoroughly insulate the lead plate from the casing. The lead plate is preferably treated with mercury, so that it will always have a clean conducting-surface, and it will be observed that portions of this conducting metal frame are exposed to the electrolyte.

The zinc plates D' are inserted into the compartment D from the top of the battery and rest directly upon the lead conducting-plate $D^2$, so that in the event of one or more of the zinc plates being reduced it can be readily withdrawn and a new plate inserted with very little trouble.

In order to prevent the zinc plates from coming in contact with the casing, I provide non-conducting strips $d'$, which are placed at each end of each compartment D. These insulating-strips are preferably made of hard rubber.

I arrange rubber bands $d^2$ around each casing for the depolarizing agent and around the end zinc plates of the series; but the rubber bands may, in some instances, be placed upon all the zinc plates; but in order to make the bands a fixture in the battery I place them around the cells containing the depolarizing agent, as described. Then the zincs can be withdrawn and replaced without having to replace and adjust the bands. Thus it will be seen that the zinc plates are prevented from coming in contact with the carbon partition-plates and short-circuiting is prevented.

The lead conducting-plate $D^2$ has a terminal $d^3$, which passes through a non-conducting nipple $d^4$ and forms one terminal of the battery. The non-conducting nipple is made in two sections, one section having an internal and an external screw-thread, the internal thread being screwed upon the terminal $d^3$, and a nut section is screwed upon the external thread, so as to form a non-conducting joint through which the exciting liquid cannot escape.

At one end of the casing, near the upper edge, I form a channel E by securing a sheet of lead to the casing by burning. This channel communicates with the compartments B for the depolarizing agent through a series of passages $e$ and has a T-headed nipple $e'$, to each arm of which can be attached a coupling $e^2$, as shown in Fig. 1, which forms the feed-pipe. I preferably provide a channel E' on the side opposite the channel E, and this channel communicates with all the compartments B and has a T-headed nipple $e^3$, forming an air-vent, so as to allow the air to escape as the compartment is charged with liquid. I preferably connect the air-vents in the same manner as the liquid-inlet channels. Preferably directly below the channel E is a channel F, which communicates, through the passages $f$, with the compartments D for the exciting fluid. This channel has a T-headed nipple $f'$, similar to the nipple $e'$. Directly above the base is a channel G, which communicates with the compartments B through passages $g$ and has a T-headed nipple $g'$. The compartment B can be drained through this channel G. A T-headed nipple H communicates with the chamber D at the base, so as to drain said chamber.

By the arrangement above described the spent depolarizing agent can be discharged from the battery through the channel G and fresh depolarizing liquid can be fed into the compartments B through the channel E. The exciting liquid can be withdrawn through the nipple H, and the compartments D can be charged with fresh liquid through the channel F.

A series of batteries can be arranged side by side, as shown in Fig. 1, and the several nipples coupled by the tubes $e^2$, preferably of rubber, forming continuations of the feed-pipes E' and F' and continuations of the outlet-pipes G' and H', so that any number of batteries can be discharged and charged simultaneously without disturbing the cells, and when necessary the zinc plates can be withdrawn and new plates substituted therefor.

In assembling my improved battery I first mold the carbon sections in suitable form and then cast the lead conducting-frames around them. I then assemble these frames in pairs, using separating-strips $b\ b'\ b^2$ of lead of a sufficient width to allow space for the depolarizing agent. These strips are secured to the plates by burning. After the sections are thus formed they are assembled, as shown in Fig. 3, spaced apart by lead strips $b^4$ at each side, which are secured to the sections by burning, thus forming a compartment for the exciting fluid and the zinc plates. These compartments are open at the top and bottom. Additional partition-plates are placed at each side, separated from the lead plates $b^5$, forming the sides of the cell, by narrow strips $b^6$, forming narrow compartments for containing the depolarizing agent, and thus forming a homogeneous structure of conducting-metal, preferably lead, which acts as one element of the battery, the other element being the zinc plates. The next step is to form the bottom section A', pour in the asphaltum, and then place the lead conducting-plate $D^2$ in position and couple its terminal to the casing by the non-conducting nipples, so as to prevent leakage. The bottom plate is then mounted underneath the main body of the casing and secured thereto by burning or other means. Holes are made in the ends of the several compartments and the connecting-channels are formed preferably by lead plates burned onto the casing. The battery is now in condition to receive the zinc plates, which are cast in such a form as to be readily slipped into position and to rest on the conducting-plate $D^2$. The depolarizing liquid, which in the present instance is acidified sodium bichromate, is allowed to flow into the compartment B through the feed-pipe E', and the exciting liquid, which in the present instance is dilute sulfuric acid, is allowed to flow into the compartment D through the feed-pipe F'. The battery is now ready for immediate use.

By the above construction I gain a relatively large active electrode-surface in an extraordinarily compact form and considerably decrease the weight of the battery of this type, considering the amount of current capable of being generated, while the amount of liquid necessary to fill the compartment is relatively small. Furthermore, my improved battery can be charged and discharged without removing the battery or any of the elements excepting the liquid and an occasional renewal of the zincs. By providing suitable tanks for containing the fresh liquid and separate tanks for containing the spent liquid and connecting these tanks to the cells by valved pipes, by simply turning the valves the batteries can be charged and recharged at will and the liquid can be saved for regeneration.

In comparing my improved battery with the ordinary storage battery, which it is intended to supersede, it is impossible to short-circuit or burn out my improved battery. The short-circuiting of a secondary battery often results from the buckling of the lead plates or by accidentally dropping of portions of the spongy lead from the openings in the grid, which may make contact between the several plates. This cannot occur in a primary battery of my construction, owing to the fact that the carbon plates mounted within the leaden frames are always in contact, do not waste away, and will not crumble in use. Furthermore, the life of a storage battery or its durability is relatively short, as the rapid discharging tends to lessen the active material, and it is almost impossible to prevent buckling, whereas my battery only requires the renewal of the zinc plates and the replenishing of the exciting solutions.

By constructing the battery in the manner described in detail I insure the perfect operation of the battery, reduce the cost of construction considerably, dispense with extra elements, utilizing the porous partitions as conducting-plates, and make absolutely tight joints between the several compartments. Furthermore, the chambers for the depolarizing agent are closed except the small air-vent formed on one side, and the chamber containing the zinc plates and oxidizing fluid can be closed by a plate $A^3$, inserted in the top of the battery-casing, having a gasket $a^3$ around it edge, so that it will fit snugly within the casing. This plate may have an extended air-vent $a^4$ to allow for the escape of any gases that may arise from the exciting fluid. It will be noticed, however, that a cap of this type is only necessary when the battery is in a position to be jolted.

When I arrange a series of the battery-cells side by side, as shown in Fig. 1, I couple them together with the tubes of insulating material and separate the cells by thin partitions of wood or other non-conducting material, as shown, so that while the cells are held firmly together they are insulated one from the other.

I claim as my invention—

1. The combination in a primary battery, of the series of partitions formed of frames of conducting metal acting as one terminal of the battery and supporting sheets of porous material, said partitions forming chambers, the alternate chambers being for the reception of the depolarizing agent, the other chambers being for the reception of the exciting fluid and zinc electrodes, substantially as described.

2. The combination in a primary battery, of a series of partitions formed of frames of conducting metal acting as one terminal of the battery supporting sheets of porous carbon and forming chambers, the alternate chambers being for the reception of the depolarizing agent, the other chambers being for the reception of the exciting fluid and the zinc electrodes, substantially as described.

3. The combination, in a primary battery, of a casing, a series of negative electrodes consisting of partitions formed of frames of conducting metal having portions exposed to the electrolyte, said frames supporting sheets of porous material, each pair of partitions being secured together to form closed compartments for the depolarizing agent, and spaces between each pair of said partitions for the exciting fluid, and positive electrodes in said spaces, substantially as described.

4. The combination in a primary battery, of a series of porous carbon plates spaced a given distance apart forming compartments, each alternate compartment adapted to receive a depolarizing agent, the other compartments adapted to receive a zinc electrode and exciting liquid, and a containing casing of conducting metal forming the terminal for the carbon plates, substantially as described.

5. The combination in a primary battery, of a series of partitions, each partition made up of a frame of conducting material supporting a number of thin porous plates, the said partitions being separated by strips of conducting metal, said partitions and strips forming compartments for the reception of the liquids and acting as one terminal of the battery, substantially as described.

6. The combination of a series of partitions, each partition made up of a number of thin porous carbon plates held together by a conducting metallic frame, each pair of partitions being secured together forming closed compartments for the depolarizing agent, the space between each pair of partitions being for the reception of the exciting fluid and the zinc electrodes, and a conducting-casing inclosing the several partitions and acting as a terminal for the carbon plates, substantially as described.

7. The combination in a primary battery, of a series of porous conducting-plates dividing the battery into a series of cells, each alternate cell being closed and adapted to receive the depolarizing agent, the other cells being adapted to receive the zinc plates and the exciting fluid, the closed cells stopping short of the bottom, and a conducting-plate at the bottom on which the zinc plates rest, substantially as described.

8. The combination in a primary battery, of a series of porous conducting-plates dividing the cell into a series of compartments, the alternate compartments being closed and adapted to receive the depolarizing agent, the other compartments adapted to receive the zinc plates and exciting fluid, the removable bottom, and the conducting-plate mounted on said bottom on which the zinc plates rest, said conducting-plate being insulated from the bottom, substantially as described.

9. A combined porous plate and electrode for a battery, consisting of a series of porous conducting carbon sections and a metallic conducting-frame inclosing and retaining the sections and having a terminal connection.

10. A porous conducting partition-plate for a primary battery consisting of a series of porous carbon sections held together in a cast metallic conducting-frame, the said sections being notched so that the metal enters the notches, substantially as described.

11. A section of a primary battery consisting of two side plates composed of a frame cast around thin plates of porous carbon, with strips of lead mounted between the two side plates and fused thereto, substantially as described.

12. A battery made up of a series of sections, each section having side plates made of cast lead surrounding a series of thin carbon plates and separated by thin strips of lead fused thereto, the sections of the battery being separated by other strips of lead at the side secured to the sections by being fused to the side plates of sheet-lead and the bottom, the whole constructed substantially as described.

13. The combination in a primary battery, of a main body portion made up of a series of lead frames having porous carbon sections, the alternate chambers being closed and stopping short of the bottom, with a removable bottom section having a flange fused to the main body, and a conducting-plate in the said bottom section and insulated therefrom, the terminal extending through the bottom section, substantially as described.

14. A primary battery made up of a series of conducting-partitions suitably spaced to form compartments, the alternate compartments being closed, a bottom having a conducting-plate, zinc plates adapted to the open compartments of the battery resting upon the said bottom conducting-plate, two channels at the upper portion of the battery, one channel communicating with the closed compartments, the other channel communicating with the open compartments, an outlet-pipe communicating with the open compartments at the bottom, and an outlet-channel at the bottom communicating with the closed compartments, substantially as described.

15. A primary battery made up of a series of conducting-partitions suitably spaced to form compartments, the alternate compartments being closed, a bottom having a conducting-plate, zinc plates adapted to the open compartments of the battery resting upon the said bottom conducting-plate, two channels at the upper portion of the battery, one channel communicating with the closed compartments, the other channel communicating with the open compartments, an outlet-pipe communicating with the open compartments at the bottom, an outlet-channel at the bottom communicating with the closed compartments, and an air-vent channel communicating with the closed compartments, substantially as described.

16. The combination in a primary battery, of a series of conducting porous partitions forming compartments, the alternate compartments being closed, a bottom conducting-plate, zinc plates mounted in the open compartments and resting upon the bottom conducting-plate, insulating material separating the zinc plates from the porous conducting-plates and end insulating-strips separating the zinc plates from the casing, a terminal secured to the casing and a terminal secured to the bottom plate, substantially as described.

17. The combination in a primary battery, of a series of conducting porous plates forming compartments, the alternate compartments being closed, a removable bottom plate, a bed of non-conducting material, a conducting-plate embedded in said bed, zinc plates resting upon said conducting-plate, an extension of the conducting-plate passing through the casing, a nipple screwed onto said extension and having an external screw-thread, a nut adapted to the external screw-thread and mounted on the outside of the casing forming a non-conducting and water-tight joint, substantially as described.

In testimony whereof I have signed my name to this specification in the presence of two subscribing witnesses.

HENRY K. HESS.

Witnesses:
 WILL. A. BARR,
 JOS. H. KLEIN.